US012217713B2

(12) United States Patent
Dunn et al.

(10) Patent No.: US 12,217,713 B2
(45) Date of Patent: Feb. 4, 2025

(54) DISPLAY UNITS WITH AUTOMATED POWER GOVERNING

(71) Applicant: Manufacturing Resources International, Inc., Alpharetta, GA (US)

(72) Inventors: William Dunn, Alpharetta, GA (US); John Schuch, Buford, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

(21) Appl. No.: 18/885,160

(22) Filed: Sep. 13, 2024

(65) Prior Publication Data

US 2025/0006147 A1 Jan. 2, 2025

Related U.S. Application Data

(63) Continuation of application No. 18/652,287, filed on May 1, 2024, now Pat. No. 12,118,953, which is a (Continued)

(51) Int. Cl.
*G09G 3/36* (2006.01)
*G09G 1/00* (2006.01)

(52) U.S. Cl.
CPC ............... *G09G 3/36* (2013.01); *G09G 1/005* (2013.01); *G09G 2320/041* (2013.01); *G09G 2330/021* (2013.01)

(58) Field of Classification Search
CPC ................................................ G09G 2330/021
See application file for complete search history.

(56) References Cited

U.S. PATENT DOCUMENTS

| | | | |
|---|---|---|---|
| 4,093,355 | A | 6/1978 | Kaplit et al. |
| 4,593,978 | A | 6/1986 | Mourey et al. |

(Continued)

FOREIGN PATENT DOCUMENTS

| | | | |
|---|---|---|---|
| AU | 2010218083 | B2 | 10/2016 |
| AU | 2016203550 | B2 | 3/2018 |

(Continued)

OTHER PUBLICATIONS

Novitsky, T. et al., Design How-To, Driving LEDs versus CCFLs for LCD backlighting, EE Times, Nov. 12, 2007, 6 pages, AspenCore.

(Continued)

*Primary Examiner* — Gustavo Polo
(74) *Attorney, Agent, or Firm* — Standley Law Group LLP; Jeffrey S. Standley; Adam J. Smith

(57) ABSTRACT

Display units for executing operational updates in a prioritized fashion are disclosed. A control subsystem is in electronic communication with an electronic display, sensor(s), and a thermal management subsystem. Requests to update established operational parameters for the electronic display and the thermal management subsystem are received at the control subsystem. The established operational parameters include operational parameters specific to sensor readings. The control subsystem determines which of the requests would provide a largest change to the established operational parameters if implemented, and prioritize that, largest, one of the requests for execution.

20 Claims, 4 Drawing Sheets

Related U.S. Application Data continuation of application No. 18/214,948, filed on Jun. 27, 2023, now Pat. No. 12,027,132.

(56) References Cited

U.S. PATENT DOCUMENTS 4,634,225 A 1/1987 Haim et al.
4,722,669 A 2/1988 Kundert
5,029,982 A 7/1991 Nash
5,086,314 A 2/1992 Aoki et al.
5,088,806 A 2/1992 McCartney et al.
5,162,785 A 11/1992 Fagard
5,247,374 A 9/1993 Terada
5,285,677 A 2/1994 Oehler
5,559,614 A 9/1996 Urbish et al.
5,661,374 A 8/1997 Cassidy et al.
5,748,269 A 5/1998 Harris et al.
5,767,489 A 6/1998 Ferrier
5,769,705 A 6/1998 O'Callaghan et al.
5,783,909 A 7/1998 Hochstein
5,786,801 A 7/1998 Ichise
5,808,418 A 9/1998 Pitman et al.
5,818,010 A 10/1998 McCann
5,952,992 A 9/1999 Helms
5,991,153 A 11/1999 Heady et al.
6,085,152 A 7/2000 Doerfel
6,089,751 A 7/2000 Conover et al.
6,144,359 A 11/2000 Grave
6,153,985 A 11/2000 Grossman
6,157,143 A 12/2000 Bigio et al.
6,157,432 A 12/2000 Helbing
6,181,070 B1 1/2001 Dunn et al.
6,191,839 B1 2/2001 Briley et al.
6,259,492 B1 7/2001 Imoto et al.
6,292,228 B1 9/2001 Cho
6,297,859 B1 10/2001 George
6,380,853 B1 4/2002 Long et al.
6,388,388 B1 5/2002 Weindorf et al.
6,400,101 B1 6/2002 Biebl et al.
6,417,900 B1 7/2002 Shin et al.
6,496,236 B1 12/2002 Cole et al.
6,509,911 B1 1/2003 Shimotono
6,535,266 B1 3/2003 Nemeth et al.
6,556,258 B1 4/2003 Yoshida et al.
6,628,355 B1 9/2003 Takahara
6,701,143 B1 3/2004 Dukach et al.
6,712,046 B2 3/2004 Nakamichi
6,753,661 B2 6/2004 Muthu et al.
6,753,842 B1 6/2004 Williams et al.
6,762,741 B2 7/2004 Weindorf
6,798,341 B1 9/2004 Eckel et al.
6,809,718 B2 10/2004 Wei et al.
6,812,851 B1 11/2004 Dukach et al.
6,813,375 B2 11/2004 Armato, III et al.
6,839,104 B2 1/2005 Taniguchi et al.
6,850,209 B2 2/2005 Mankins et al.
6,885,412 B2 4/2005 Ohnishi et al.
6,886,942 B2 5/2005 Okada et al.
6,891,135 B2 5/2005 Pala et al.
6,943,768 B2 9/2005 Cavanaugh et al.
6,982,686 B2 1/2006 Miyachi et al.
6,996,460 B1 2/2006 Krahnstoever et al.
7,015,470 B2 3/2006 Faytlin et al.
7,038,186 B2 5/2006 De Brabander et al.
7,064,733 B2 6/2006 Cok et al.
7,083,285 B2 8/2006 Hsu et al.
7,136,076 B2 11/2006 Evanicky et al.
7,174,029 B2 2/2007 Agostinelli et al.
7,176,640 B2 2/2007 Tagawa
7,236,154 B1 6/2007 Kerr et al.
7,307,614 B2 12/2007 Vinn
7,324,080 B1 1/2008 Hu et al.
7,330,002 B2 2/2008 Joung
7,354,159 B2 4/2008 Nakamura et al.
7,447,018 B2 11/2008 Lee et al.
7,474,294 B2 1/2009 Leo et al.
7,480,042 B1 1/2009 Phillips et al.
7,518,600 B2 4/2009 Lee
7,595,785 B2 9/2009 Jang
7,639,220 B2 12/2009 Yoshida et al.
7,659,676 B2 2/2010 Hwang
7,692,621 B2 4/2010 Song
7,724,247 B2 5/2010 Yamazaki et al.
7,795,574 B2 9/2010 Kennedy et al.
7,795,821 B2 9/2010 Jun
7,800,706 B2 9/2010 Kim et al.
7,804,477 B2 9/2010 Sawada et al.
7,982,706 B2 7/2011 Ichikawa et al.
8,087,787 B2 1/2012 Medin
8,111,371 B2 2/2012 Suminoe et al.
8,125,163 B2 2/2012 Dunn et al.
8,144,110 B2 3/2012 Huang
8,175,841 B2 5/2012 Ooghe
8,194,031 B2 6/2012 Yao et al.
8,248,203 B2 8/2012 Hanwright et al.
8,319,936 B2 11/2012 Yoshida et al.
8,325,057 B2 12/2012 Salter
8,352,758 B2 1/2013 Atkins et al.
8,508,155 B2 8/2013 Schuch
8,569,910 B2 10/2013 Dunn et al.
8,605,121 B2 12/2013 Chu et al.
8,643,589 B2 2/2014 Wang
8,700,226 B2 4/2014 Schuch et al.
8,797,372 B2 8/2014 Liu
8,810,501 B2 8/2014 Budzelaar et al.
8,823,630 B2 9/2014 Roberts et al.
8,829,815 B2 9/2014 Dunn et al.
8,895,836 B2 11/2014 Amin et al.
8,901,825 B2 12/2014 Reed
8,982,013 B2 3/2015 Sako et al.
8,983,385 B2 3/2015 Macholz
8,988,011 B2 3/2015 Dunn
9,030,129 B2 5/2015 Dunn et al.
9,167,655 B2 10/2015 Dunn et al.
9,286,020 B2 3/2016 Dunn et al.
9,400,192 B1 7/2016 Salser, Jr. et al.
9,448,569 B2 9/2016 Schuch et al.
9,451,060 B1 9/2016 Bowers et al.
9,445,470 B2 11/2016 Wang et al.
9,516,485 B1 12/2016 Bowers et al.
9,536,325 B2 1/2017 Bray et al.
9,622,392 B1 4/2017 Bowers et al.
9,629,287 B2 4/2017 Dunn
9,799,306 B2 10/2017 Dunn et al.
9,867,253 B2 1/2018 Dunn et al.
9,881,528 B2 1/2018 Dunn
9,924,583 B2 3/2018 Schuch et al.
10,194,562 B2 1/2019 Shelnutt et al.
10,255,884 B2 4/2019 Dunn et al.
10,321,549 B2 6/2019 Schuch et al.
10,409,544 B2 9/2019 Park et al.
10,412,816 B2 9/2019 Schuch et al.
10,440,790 B2 10/2019 Dunn et al.
10,506,738 B2 12/2019 Dunn
10,578,658 B2 3/2020 Dunn et al.
10,586,508 B2 3/2020 Dunn
10,593,255 B2 3/2020 Schuch et al.
10,607,520 B2 3/2020 Schuch et al.
10,782,276 B2 9/2020 Dunn et al.
10,795,413 B1 10/2020 Dunn
10,803,783 B2 10/2020 Wang et al.
10,858,886 B2 12/2020 Fasi et al.
10,860,141 B2 12/2020 Wang et al.
11,016,547 B2 5/2021 Whitehead et al.
11,022,635 B2 6/2021 Dunn et al.
11,032,923 B2 6/2021 Dunn et al.
11,132,715 B2 9/2021 Menendez et al.
11,293,908 B2 4/2022 Dunn et al.
11,526,044 B2 12/2022 Dunn
11,540,418 B2 12/2022 Dunn et al.
11,656,255 B2 5/2023 Dunn et al.
11,774,428 B2 10/2023 Dunn et al.
11,815,755 B2 11/2023 Dunn
11,977,065 B2 5/2024 Dunn et al.
12,007,637 B2 6/2024 Dunn

(56) References Cited

U.S. PATENT DOCUMENTS

| | | | |
|---|---|---|---|
| 12,022,635 | B2 | 6/2024 | Dunn et al. |
| 12,027,132 | B1 | 7/2024 | Dunn et al. |
| 2002/0009978 | A1 | 1/2002 | Dukach et al. |
| 2002/0020090 | A1 | 2/2002 | Sanders |
| 2002/0050974 | A1 | 5/2002 | Rai et al. |
| 2002/0065046 | A1 | 5/2002 | Mankins et al. |
| 2002/0084891 | A1 | 7/2002 | Mankins et al. |
| 2002/0101553 | A1 | 8/2002 | Enomoto et al. |
| 2002/0112026 | A1 | 8/2002 | Fridman et al. |
| 2002/0126248 | A1 | 9/2002 | Yoshida |
| 2002/0154138 | A1 | 10/2002 | Wada et al. |
| 2002/0164962 | A1 | 11/2002 | Mankins et al. |
| 2002/0167637 | A1 | 11/2002 | Burke et al. |
| 2002/0190972 | A1 | 12/2002 | Ven de Van |
| 2003/0007109 | A1 | 1/2003 | Park |
| 2003/0088832 | A1 | 5/2003 | Agostinelli et al. |
| 2003/0122810 | A1 | 7/2003 | Tsirkel et al. |
| 2003/0204342 | A1 | 10/2003 | Law et al. |
| 2003/0214242 | A1 | 11/2003 | Berg-johansen |
| 2003/0230991 | A1 | 12/2003 | Muthu et al. |
| 2004/0032382 | A1 | 2/2004 | Cok et al. |
| 2004/0036622 | A1 | 2/2004 | Dukach et al. |
| 2004/0036697 | A1 | 2/2004 | Kim et al. |
| 2004/0036834 | A1 | 2/2004 | Ohnishi et al. |
| 2004/0113044 | A1 | 6/2004 | Ishiguchi |
| 2004/0165139 | A1 | 8/2004 | Anderson et al. |
| 2004/0201547 | A1 | 10/2004 | Takayama |
| 2004/0243940 | A1 | 12/2004 | Lee et al. |
| 2005/0012734 | A1 | 1/2005 | Johnson et al. |
| 2005/0024538 | A1 | 2/2005 | Park et al. |
| 2005/0043907 | A1 | 2/2005 | Eckel et al. |
| 2005/0049729 | A1 | 3/2005 | Culbert et al. |
| 2005/0073518 | A1 | 4/2005 | Bontempi |
| 2005/0094391 | A1 | 5/2005 | Campbell et al. |
| 2005/0127796 | A1 | 6/2005 | Olesen et al. |
| 2005/0140640 | A1 | 6/2005 | Oh et al. |
| 2005/0184983 | A1 | 8/2005 | Brabander et al. |
| 2005/0231457 | A1 | 10/2005 | Yamamoto et al. |
| 2005/0242741 | A1 | 11/2005 | Shiota et al. |
| 2006/0007107 | A1 | 1/2006 | Ferguson |
| 2006/0022616 | A1 | 2/2006 | Furukawa et al. |
| 2006/0038511 | A1 | 2/2006 | Tagawa |
| 2006/0049533 | A1 | 3/2006 | Kamoshita |
| 2006/0087521 | A1 | 4/2006 | Chu et al. |
| 2006/0125773 | A1 | 6/2006 | Ichikawa et al. |
| 2006/0130501 | A1 | 6/2006 | Singh et al. |
| 2006/0197474 | A1 | 9/2006 | Olsen |
| 2006/0197735 | A1 | 9/2006 | Vuong et al. |
| 2006/0207730 | A1 | 9/2006 | Berman et al. |
| 2006/0214904 | A1 | 9/2006 | Kimura et al. |
| 2006/0215044 | A1 | 9/2006 | Masuda et al. |
| 2006/0220571 | A1 | 10/2006 | Howell et al. |
| 2006/0238531 | A1 | 10/2006 | Wang |
| 2006/0244702 | A1 | 11/2006 | Yamazaki et al. |
| 2007/0013828 | A1 | 1/2007 | Cho et al. |
| 2007/0047808 | A1 | 3/2007 | Choe et al. |
| 2007/0152949 | A1 | 7/2007 | Sakai |
| 2007/0153117 | A1 | 7/2007 | Lin et al. |
| 2007/0171647 | A1 | 7/2007 | Artwohl et al. |
| 2007/0173297 | A1 | 7/2007 | Cho et al. |
| 2007/0200513 | A1 | 8/2007 | Ha et al. |
| 2007/0222730 | A1 | 9/2007 | Kao et al. |
| 2007/0230167 | A1 | 10/2007 | McMahon et al. |
| 2007/0242153 | A1 | 10/2007 | Tang et al. |
| 2007/0247594 | A1 | 10/2007 | Tanaka |
| 2007/0268234 | A1 | 11/2007 | Wakabayashi et al. |
| 2007/0268241 | A1 | 11/2007 | Nitta et al. |
| 2007/0273624 | A1 | 11/2007 | Geelen |
| 2007/0279369 | A1 | 12/2007 | Yao et al. |
| 2007/0291198 | A1 | 12/2007 | Shen |
| 2007/0297163 | A1 | 12/2007 | Kim et al. |
| 2007/0297172 | A1 | 12/2007 | Furukawa et al. |
| 2008/0019147 | A1 | 1/2008 | Erchak et al. |
| 2008/0055297 | A1 | 3/2008 | Park |
| 2008/0074382 | A1 | 3/2008 | Lee et al. |
| 2008/0078921 | A1 | 4/2008 | Yang et al. |
| 2008/0084166 | A1 | 4/2008 | Tsai |
| 2008/0111958 | A1 | 5/2008 | Kleverman et al. |
| 2008/0136770 | A1 | 6/2008 | Peker et al. |
| 2008/0143187 | A1 | 6/2008 | Hoekstra et al. |
| 2008/0151082 | A1 | 6/2008 | Chan |
| 2008/0165203 | A1 | 7/2008 | Pantfoerder |
| 2008/0170031 | A1 | 7/2008 | Kuo |
| 2008/0176345 | A1 | 7/2008 | Yu et al. |
| 2008/0185976 | A1 | 8/2008 | Dickey et al. |
| 2008/0204375 | A1 | 8/2008 | Shin et al. |
| 2008/0218501 | A1 | 9/2008 | Diamond |
| 2008/0224892 | A1 | 9/2008 | Bogolea et al. |
| 2008/0230497 | A1 | 9/2008 | Strickland et al. |
| 2008/0246871 | A1 | 10/2008 | Kupper et al. |
| 2008/0259198 | A1 | 10/2008 | Chen et al. |
| 2008/0266554 | A1 | 10/2008 | Sekine et al. |
| 2008/0278099 | A1 | 11/2008 | Bergfors et al. |
| 2008/0278100 | A1 | 11/2008 | Hwang |
| 2008/0303918 | A1 | 12/2008 | Keithley |
| 2009/0009997 | A1 | 1/2009 | Sanfilippo et al. |
| 2009/0014548 | A1 | 1/2009 | Criss et al. |
| 2009/0033612 | A1 | 2/2009 | Roberts et al. |
| 2009/0079416 | A1 | 3/2009 | Vinden et al. |
| 2009/0085859 | A1 | 4/2009 | Song |
| 2009/0091634 | A1 | 4/2009 | Kennedy et al. |
| 2009/0104989 | A1 | 4/2009 | Williams et al. |
| 2009/0109129 | A1 | 4/2009 | Cheong et al. |
| 2009/0135167 | A1 | 5/2009 | Sakai et al. |
| 2009/0152445 | A1 | 6/2009 | Gardner, Jr. |
| 2009/0278766 | A1 | 11/2009 | Sako et al. |
| 2009/0284457 | A1 | 11/2009 | Botzas et al. |
| 2009/0289968 | A1 | 11/2009 | Yoshida |
| 2010/0033413 | A1 | 2/2010 | Song et al. |
| 2010/0039366 | A1 | 2/2010 | Hardy |
| 2010/0039414 | A1 | 2/2010 | Bell |
| 2010/0039440 | A1 | 2/2010 | Tanaka et al. |
| 2010/0060861 | A1 | 3/2010 | Medin |
| 2010/0066484 | A1 | 3/2010 | Hanwright et al. |
| 2010/0177750 | A1 | 7/2010 | Essinger et al. |
| 2010/0194725 | A1 | 8/2010 | Yoshida et al. |
| 2010/0231602 | A1 | 9/2010 | Huang |
| 2010/0237697 | A1 | 9/2010 | Dunn et al. |
| 2010/0253660 | A1 | 10/2010 | Hashimoto |
| 2010/0309361 | A1 | 12/2010 | Fukushima |
| 2011/0016006 | A1 | 1/2011 | Opdycke |
| 2011/0032285 | A1 | 2/2011 | Yao et al. |
| 2011/0032489 | A1 | 2/2011 | Kimoto et al. |
| 2011/0050738 | A1 | 3/2011 | Fujioka et al. |
| 2011/0058326 | A1 | 3/2011 | Idems et al. |
| 2011/0074737 | A1 | 3/2011 | Hsieh et al. |
| 2011/0074803 | A1 | 3/2011 | Kerofsky |
| 2011/0102630 | A1 | 5/2011 | Rukes |
| 2011/0148904 | A1 | 6/2011 | Kotani |
| 2011/0163691 | A1 | 7/2011 | Dunn |
| 2011/0175872 | A1 | 7/2011 | Chuang et al. |
| 2011/0193872 | A1 | 8/2011 | Biernath et al. |
| 2011/0231676 | A1 | 9/2011 | Atkins et al. |
| 2011/0260534 | A1 | 10/2011 | Rozman et al. |
| 2011/0264273 | A1 | 10/2011 | Grabinger et al. |
| 2011/0279426 | A1 | 11/2011 | Imamura et al. |
| 2011/0283199 | A1 | 11/2011 | Schuch et al. |
| 2012/0075362 | A1 | 3/2012 | Ichioka et al. |
| 2012/0081279 | A1 | 4/2012 | Greenebaum et al. |
| 2012/0162204 | A1 | 6/2012 | Vesely et al. |
| 2012/0176420 | A1 | 7/2012 | Liu |
| 2012/0182278 | A1 | 7/2012 | Ballestad |
| 2012/0197459 | A1 | 8/2012 | Fukano |
| 2012/0211001 | A1 | 8/2012 | Elshafei |
| 2012/0212520 | A1 | 8/2012 | Matsui et al. |
| 2012/0252495 | A1 | 10/2012 | Moeglein et al. |
| 2012/0268436 | A1 | 10/2012 | Chang |
| 2012/0269382 | A1 | 10/2012 | Kiyohara et al. |
| 2012/0284547 | A1 | 11/2012 | Culbert et al. |
| 2013/0027370 | A1 | 1/2013 | Dunn et al. |
| 2013/0070567 | A1 | 3/2013 | Marzouq |
| 2013/0098425 | A1 | 4/2013 | Amin et al. |
| 2013/0113973 | A1 | 5/2013 | Miao |
| 2013/0158730 | A1 | 6/2013 | Yasuda et al. |

(56) References Cited

U.S. PATENT DOCUMENTS

| | | | |
|---|---|---|---|
| 2013/0278868 | A1 | 10/2013 | Dunn et al. |
| 2013/0279090 | A1 | 10/2013 | Brandt |
| 2013/0344794 | A1 | 12/2013 | Shaw et al. |
| 2014/0002747 | A1 | 1/2014 | Macholz |
| 2014/0132796 | A1 | 5/2014 | Prentice et al. |
| 2014/0139116 | A1 | 5/2014 | Reed |
| 2014/0184980 | A1 | 7/2014 | Onoue |
| 2014/0190240 | A1 | 7/2014 | He et al. |
| 2014/0204452 | A1 | 7/2014 | Branson |
| 2014/0232709 | A1 | 8/2014 | Dunn et al. |
| 2014/0293605 | A1 | 10/2014 | Chemel et al. |
| 2014/0365965 | A1 | 12/2014 | Bray et al. |
| 2015/0062892 | A1 | 3/2015 | Krames et al. |
| 2015/0070337 | A1 | 3/2015 | Bell et al. |
| 2015/0310313 | A1 | 10/2015 | Murayama et al. |
| 2015/0319882 | A1 | 11/2015 | Dunn et al. |
| 2015/0346525 | A1 | 12/2015 | Wolf et al. |
| 2015/0348460 | A1 | 12/2015 | Cox et al. |
| 2016/0055671 | A1 | 2/2016 | Menozzi et al. |
| 2016/0037606 | A1 | 4/2016 | Dunn et al. |
| 2016/0162297 | A1 | 6/2016 | Shao |
| 2016/0198545 | A1 | 7/2016 | Dunn et al. |
| 2016/0293142 | A1 | 10/2016 | Bowden et al. |
| 2016/0334811 | A1 | 11/2016 | Marten |
| 2016/0335698 | A1 | 11/2016 | Jones et al. |
| 2016/0338181 | A1 | 11/2016 | Schuch et al. |
| 2016/0338182 | A1 | 11/2016 | Schuch et al. |
| 2016/0358530 | A1 | 12/2016 | Schuch et al. |
| 2016/0358538 | A1 | 12/2016 | Schuch et al. |
| 2016/0360167 | A1 | 12/2016 | Mitchell et al. |
| 2017/0060369 | A1 | 3/2017 | Goyal et al. |
| 2017/0111486 | A1 | 4/2017 | Bowers et al. |
| 2017/0111520 | A1 | 4/2017 | Bowers et al. |
| 2017/0168295 | A1 | 6/2017 | Iwami |
| 2018/0012565 | A1 | 1/2018 | Dunn |
| 2018/0040297 | A1 | 2/2018 | Dunn et al. |
| 2018/0042134 | A1 | 2/2018 | Dunn et al. |
| 2018/0088368 | A1 | 3/2018 | Notoshi et al. |
| 2018/0129461 | A1 | 5/2018 | Kim-Whitty |
| 2018/0130385 | A1 | 5/2018 | Qian et al. |
| 2018/0132327 | A1 | 5/2018 | Dunn et al. |
| 2018/0203475 | A1 | 7/2018 | Van Derven et al. |
| 2018/0206316 | A1 | 7/2018 | Schuch et al. |
| 2019/0018506 | A1 | 1/2019 | Bernstein et al. |
| 2019/0021189 | A1 | 1/2019 | Kim et al. |
| 2019/0116719 | A1 | 4/2019 | Fletcher et al. |
| 2019/0237045 | A1 | 8/2019 | Dunn et al. |
| 2019/0289754 | A1 | 9/2019 | Hubbard |
| 2019/0339312 | A1 | 11/2019 | Dunn et al. |
| 2019/0383778 | A1 | 12/2019 | Dunn et al. |
| 2020/0012116 | A1 | 1/2020 | Fuerst et al. |
| 2020/0033017 | A1 | 1/2020 | Brown et al. |
| 2020/0128701 | A1 | 4/2020 | Whitehead et al. |
| 2020/0150162 | A1 | 5/2020 | Dunn et al. |
| 2020/0211505 | A1 | 7/2020 | Dunn |
| 2020/0294401 | A1 | 9/2020 | Kerecsen |
| 2020/0378939 | A1 | 12/2020 | Dunn et al. |
| 2020/0390009 | A1 | 12/2020 | Whitehead et al. |
| 2021/0034101 | A1 | 2/2021 | Yildiz et al. |
| 2021/0035494 | A1 | 2/2021 | Yildiz et al. |
| 2021/0263082 | A1 | 8/2021 | Dunn et al. |
| 2021/0302779 | A1 | 9/2021 | Dunn |
| 2022/0121255 | A1 | 4/2022 | Wang et al. |
| 2022/0187266 | A1 | 6/2022 | Dunn et al. |
| 2022/0295666 | A1 | 9/2022 | Dunn et al. |
| 2023/0060966 | A1 | 3/2023 | Dunn |
| 2023/0296278 | A1* | 9/2023 | Sawada ................ G05B 19/042 700/276 |
| 2023/0333423 | A1 | 10/2023 | Dunn et al. |
| 2023/0384277 | A1 | 11/2023 | Dunn et al. |
| 2024/0036379 | A1 | 2/2024 | Dunn |
| 2024/0106343 | A1 | 3/2024 | Nozawa |
| 2024/0280849 | A1 | 8/2024 | Dunn |

FOREIGN PATENT DOCUMENTS

| | | | |
|---|---|---|---|
| AU | 2016262614 | B2 | 1/2019 |
| AU | 2016308187 | B2 | 2/2020 |
| CA | 2754371 | C | 11/2017 |
| CA | 2849902 | C | 2/2019 |
| CA | 2985673 | C | 3/2021 |
| CN | 112526806 | A | 3/2021 |
| EP | 0313331 | B1 | 2/1994 |
| EP | 1686777 | A1 | 8/2006 |
| EP | 2299723 | A1 | 3/2011 |
| EP | 2401738 | A2 | 1/2012 |
| EP | 2769376 | A1 | 8/2014 |
| EP | 2577389 | B1 | 5/2017 |
| EP | 3295452 | A1 | 3/2018 |
| EP | 2401738 | B1 | 5/2018 |
| EP | 3338273 | A1 | 6/2018 |
| EP | 4309347 | A1 | 1/2024 |
| GB | 2369730 | A | 5/2002 |
| JP | 3-153212 | A | 7/1991 |
| JP | 5-18767 | A | 1/1993 |
| JP | 8193727 | A | 7/1996 |
| JP | 8-338981 | A | 12/1996 |
| JP | 11-160727 | A | 6/1999 |
| JP | 2000122575 | A | 4/2000 |
| JP | 2004325629 | A | 11/2004 |
| JP | 2005-148490 | A | 6/2005 |
| JP | 2005265922 | A | 9/2005 |
| JP | 2005-338266 | A | 12/2005 |
| JP | 2006-106345 | A | 4/2006 |
| JP | 2006-145890 | A | 6/2006 |
| JP | 2006318733 | A | 11/2006 |
| JP | 2007003638 | A | 1/2007 |
| JP | 2007322718 | A | 12/2007 |
| JP | 2008-34841 | A | 2/2008 |
| JP | 2008-83290 | A | 4/2008 |
| JP | 2008122695 | A | 5/2008 |
| JP | 2009031622 | A | 2/2009 |
| JP | 2010-181487 | A | 8/2010 |
| JP | 2010-282109 | A | 12/2010 |
| JP | 2011-59543 | A | 3/2011 |
| JP | 2014-149485 | A | 8/2014 |
| JP | 2018-523148 | A | 8/2018 |
| JP | 2018-525650 | A | 9/2018 |
| KR | 10-2006-0016469 | A | 2/2006 |
| KR | 10-0768584 | B1 | 10/2007 |
| KR | 10-2008-0000144 | A | 1/2008 |
| KR | 10-2008-0013592 | A | 2/2008 |
| KR | 10-2008-0086245 | A | 9/2008 |
| KR | 10-2009-0014903 | A | 2/2009 |
| KR | 10-2010-0019246 | A | 2/2010 |
| KR | 10-2011-0125249 | A | 11/2011 |
| KR | 10-2014-0054747 | A | 5/2014 |
| KR | 10-1759265 | B1 | 7/2017 |
| KR | 10-1931733 | B1 | 12/2018 |
| KR | 10-2047433 | B1 | 11/2019 |
| KR | 10-2130667 | B1 | 6/2020 |
| WO | 2008/050402 | A1 | 5/2008 |
| WO | 2010/141739 | A2 | 12/2010 |
| WO | 2011/052331 | A1 | 5/2011 |
| WO | 2011/130461 | A2 | 10/2011 |
| WO | 2011/150078 | A2 | 12/2011 |
| WO | 2013/044245 | A1 | 3/2013 |
| WO | 2016/183576 | A1 | 11/2016 |
| WO | 2017/031237 | A1 | 2/2017 |
| WO | 2017/210317 | A1 | 12/2017 |
| WO | 2018/009917 | A1 | 1/2018 |
| WO | 2019/241546 | A1 | 12/2019 |
| WO | 2020/081687 | A1 | 4/2020 |
| WO | 2022/197617 | A1 | 9/2022 |

OTHER PUBLICATIONS

Vogler, A. et al., Photochemistry and Beer, Journal of Chemical Education, Jan. 1982, pp. 25-27, vol. 59, No. 1.

Zeeff, T.M. et al., Abstract of EMC analysis of 18" LCD Monitor, Electromagnetic Compatibility, IEEE International Symposium, Aug. 21-25, 2000, vol. 1, 1 page.

(56) References Cited

OTHER PUBLICATIONS

Lee, X., What is Gamma Correction in Images and Videos?, http://xahlee.info/img/what_is_gamma_correction.html, Feb. 24, 2010, 4 pages.
Hoober, S. et al., Designing Mobile Interfaces, 2012, pp. 519-521, O'Reilly Media.
Outdoorlink, Inc., SmartLink Website User Manual, http://smartlink.outdoorlinkinc.com/docs/SmartLinkWebsiteUserManual.pdf, 2017, 33 pages.
Outdoorlink, Inc., SmartLink One, One Relay, http://smartlinkcontrol.com/billboard/one-relay/, retrieved Apr. 17, 2019, 2007-16, 6 pages.
Outdoorlink, Inc., SmartLink One Out of Home Media Controller, 2016, 1 page.
Rouaissia, C., Adding Proximity Detection to a Standard Analog-Resistive Touchscreen, SID 2012 Digest, 2012, 1564-1566, p. 132.

* cited by examiner

DISPLAY UNITS WITH AUTOMATED POWER GOVERNING

CROSS-REFERENCE TO RELATED APPLICATIONS

This application is a continuation of U.S. application Ser. No. 18/652,287, filed May 1, 2024, which is a continuation of U.S. application Ser. No. 18/214,948, filed Jun. 27, 2023, now U.S. Pat. No. 12,027,132, issued Jul. 2, 2024, the disclosures of which are hereby incorporated by reference as if fully restated herein.

TECHNICAL FIELD

Exemplary embodiments relate generally to display units with automated power governing as well as systems and methods related to the same.

BACKGROUND AND SUMMARY OF THE INVENTION

Digital out of home advertising has grown in recent years, and continues to be a major source of interest, not only for advertising, but also for other public announcements, various marketing and other services, "smart city" services, telecommunication services, and the like. These units are exposed to a wide variety of operating conditions (e.g., weather, user, and/or environment based) and demands (e.g., usage and/or programmed operational parameters). It is known to provide electronic displays in ruggedized enclosures, such as with thermal management and/or remote monitoring and/or control functions, to provide survivability and adaptability of such units under such demanding conditions. For example, it is known to limit alternating current (AC) draw on various electronic devices. It is also known to limit direct current (DC) draw on various electronic devices. It is also known to set thermal limits on various electronic devices where conditions are changed in response to meeting the thermal limit. However, current solutions fail to gracefully control such units in a fashion which exerts sufficient automated control to prevent or limit disruptions to user experiences while also safeguarding units from failure. What is needed is a power governing control system which reliably and operably controls such units to reduce or prevent failure while also minimizing disruption to user experience.

Units with power governing control systems which reliably control such units to reduce or prevent failure while also minimizing disruption to user experience are provided, along with systems and methods related to the same. Units may include one or more electronic displays. The units may include a control system with one or more of: an AC governor, a DC governor, and a thermal governor. The control system may be electrically interposed between a power source (e.g., external utility power supply) for the unit and some or all electricity consuming components of the unit (e.g., electronic displays, thermal management systems, customer equipment, peripheral equipment, combinations thereof, or the like). The governors may operably control illumination sources for the electronic displays, such as the backlights.

For the AC governor, where an AC current threshold is met or exceeded, the AC governor may operate in an AC current mitigation mode, such as by reducing power supplied to the illumination sources and/or other electricity consuming components rapidly, such as in a matter of seconds, and/or less than one second. The AC current threshold may be set relative to service rated current, such as between 70%-99% of the service rating. Power levels may be automatically increased where the AC current threshold is no longer met.

One or more circuit breakers or the like may be electrically interposed between the power source for the unit and some or all electricity consuming components of the unit to serve as a backup in case of continued AC current increase. The AC current threshold may be set to below the circuit breaker ratings, such as at 70%-99% thereof. AC current input may be monitored by the control system and electronic notifications may be generated and/or transmitted to remote device(s) where the AC current input is below a predetermined threshold, such as an expected current input or a margin thereof.

For the DC governor, where a DC current demand threshold is met or exceeded, the DC governor may operate in a DC current mitigation mode such as by reducing, at a relatively moderate rate, such as in a matter of multiple seconds or minutes, power to the illumination sources and/or other electricity consuming components, such as down to a zero level. Power levels may be automatically increased where the DC current threshold is no longer met.

Where one or more service limits of DC power supplies are met or exceeded, which may be a threshold above the DC current demand threshold, the DC power supplies may be automatically shut off and begin a restart sequence.

For the thermal governor, where the thermal management system of a unit is at maximum capacity or some other threshold capacity (e.g., 70-99% thereof), and any one or more internal temperatures, such as measuring by one or more temperature sensors in electronic communication with the control system, the thermal governor may operate in a thermal mitigation mode, such as by reducing to relatively slow, such as over a matter of several minutes, reduce power provided to the illumination sources, such as down to a zero level. Power levels may be automatically increased where the DC current threshold is no longer met, such as over a period of a same or different number of minutes.

The power adjustments shown and/or described herein, such as by the AC, DC, and/or thermal governors may be provided on various bases, such as but not limited to, on a linear, exponential and/or the like basis relative to the respective threshold(s). A grace value may be set such that the governors are configured to remain within the various mitigation modes unless/until the relevant values pass the respective thresholds by at least a predetermined amount. This may reduce or prevent rapid and frequent transitions between the normal mode and mitigation mode(s).

The governors may be operated independently and may independently provide benefits for reducing or eliminating failures and interruptions to user experiences. Analysis of measures against thresholds for each governor may be performed in parallel or in any sequence. The combination and operation of the governors, in particular, may provide exceptional reduction or elimination of failures and interruptions to user experiences. The integrated safety feature may alternatively, or additionally, permit the reduction in power supplies for a unit and/or reduce power consumption for a unit, among other benefits. This may allow provided power supplies to operate closer to capacity, whereby increased efficiencies are generally found. A centralized control system may prioritize received requests from the governor(s) for operational changes, such as but not limited to, by prioritizing the largest reductions to illumination levels.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
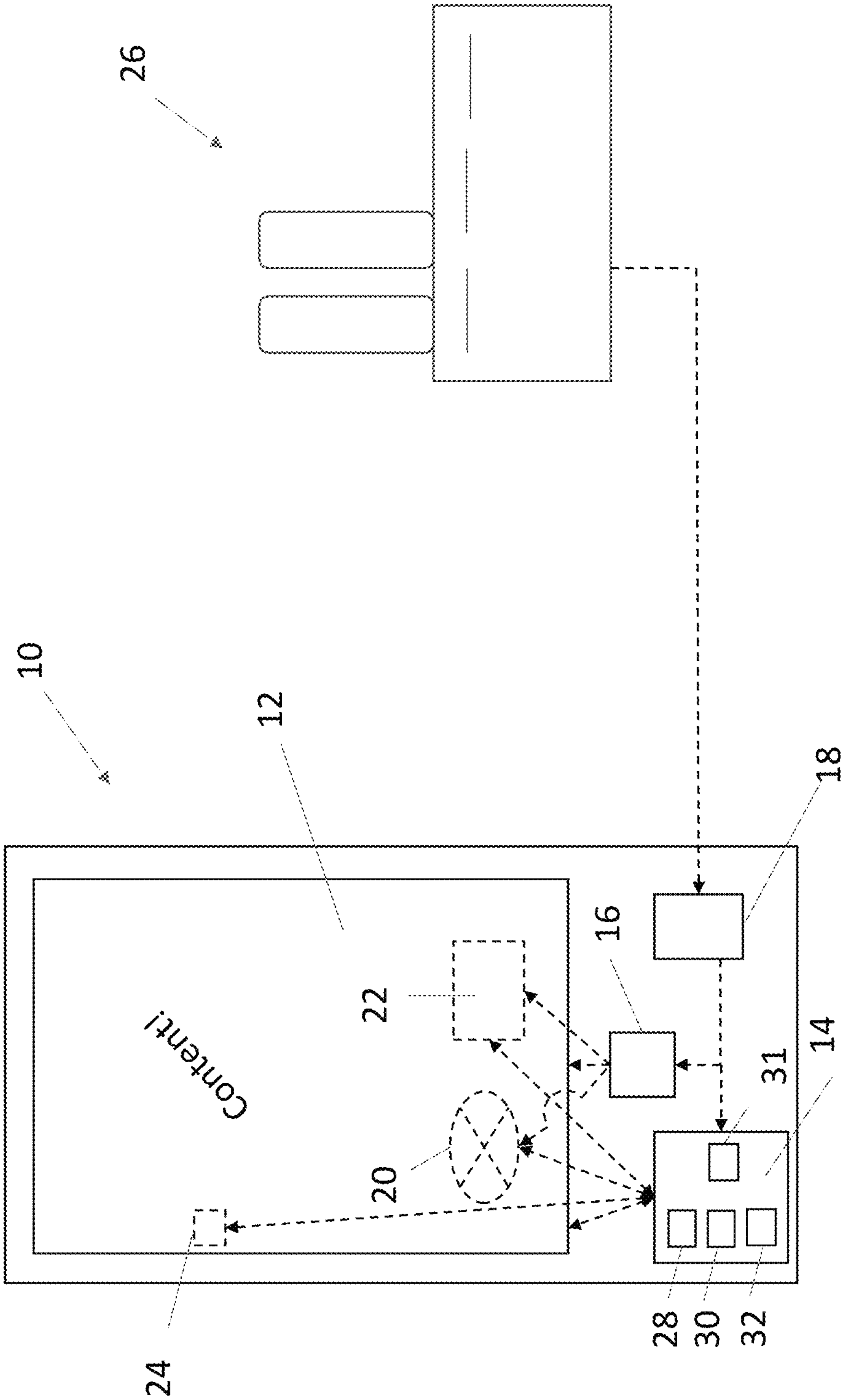
FIG. 1 is a simplified plan view of an exemplary unit with automated power governing features and related system components.

FIG. 1 illustrates an exemplary outdoor display unit 10 (hereinafter "unit" for brevity). The unit 10 may include one or more electronic displays 12 (hereinafter also "display" for brevity). Each electronic display 12 may include liquid crystal displays (LCDs), organic light emitting diode displays (OLED), light emitting diode (LED) displays, plasma displays, cathode ray tube displays, rear projection displays, combinations thereof, or the like. Each electronic display 12 may include one or more backlights, such as direct backlights, edge lighting, combinations thereof, or the like. Each display 12 may not require a separate backlight, such as in the case of OLEDs, which are self-illuminating.

The units 10 may include one or more thermal management systems 20. The thermal management systems 20 may comprise one or more fans, open loop airflow pathways, closed loop airflow pathways, thermoelectric modules, air conditioning units, sensors 24, combinations thereof, or the like. The thermal management systems 20 may be, for example, without limitation, as shown and/or described in one or more of: U.S. Pat. No. 9,629,287 granted Apr. 18, 2017 entitled SYSTEM FOR USING CONSTRICTED CONVECTION WITH CLOSED LOOP COOLING SYSTEM AS THE CONVECTION PLATE, U.S. Pat. No. 10,506,738 granted Dec. 10, 2019 entitled CONSTRICTED CONVECTION COOLING FOR AN ELECTRONIC DISPLAY, U.S. Pat. No. 11,540,418 granted Dec. 27, 2022 entitled ELECTRONIC DISPLAY WITH COOLING, and/or U.S. Pat. No. 11,032,923 granted Jun. 8, 2021 entitled FIELD SERVICEABLE DISPLAY ASSEMBLY, the disclosures of each of the foregoing being hereby incorporated by reference as if fully restated herein. Other types and/or kinds of thermal management systems 20 may be utilized.

The units 10 may include one or more additional electricity consuming components 22, such as but not limited to, radio transmitters/receivers (e.g., "5G" wireless equipment), cameras, touchscreens, sensors, servers, sensors 24, combinations thereof, or the like.

The units 10 may comprise one or more sensors 24. The sensors 24 may comprise temperature sensors, pressure sensors, air quality sensors, air flow sensors, location detection devices, light sensors, color sensors, combinations thereof, or the like. Any number and/or type of sensors 24 may be provided at any number of locations within the units 10.

The control subsystem 14 may be configured to adjust electronic display 12 illumination (e.g., backlight, OLED) based on sensed ambient lighting conditions, such as by way of the one or more sensors 24. In exemplary embodiments, without limitation, the control subsystem 14 may be configured to normally increase the power level of the electronic displays 12 under relatively high ambient light conditions to provide increased image visibility. In exemplary embodiments, without limitation, the control subsystem 14 may be configured to normally decrease the power level of the electronic displays 12 under relatively low ambient light conditions to save power. Such components and/or operations may be, for example, without limitation, as shown and/or described in U.S. Pat. No. 10,440,790 granted Oct. 8, 2019 entitled ELECTRONIC DISPLAY SYSTEM WITH ILLUMINATION CONTROL, the disclosures of which are hereby incorporated by reference as if fully restated herein. Other components and/or methods of control may be utilized.

The electronic displays 12, thermal management systems 20, additional electricity consuming components 22, sensors 24, combinations thereof, or the like may be in electronic communication with a control subsystem 14, which may receive data therefrom and/or provide operational commands to such components.

The control subsystem 14 may, additionally or alternatively, be in electronic communication with a power subsystem 16. The power subsystem 16 may comprise one or more power supplies (e.g., DC power supplies), power transformers, power regulation components, capacitors, bulk energy storage devices (e.g., batteries), power converters (e.g., AC/DC converters), switches, combinations thereof, or the like. The power subsystem 16 may be electrically interposed between some or all electricity consuming components of the unit 10 (e.g., electronic displays 12, thermal management systems 20, additional electricity consuming components 22, sensors 24, combinations thereof, or the like) and a power source 26 (e.g., external utility power supply).

Alternatively, or additionally, the control subsystem 14 may be electrically interposed between some or all electricity consuming components of the unit 10 (e.g., electronic displays 12, thermal management systems 20, additional electricity consuming components 22, sensors 24, combinations thereof, or the like) and the power source 26. The power source 26 may comprise one or more external utility power supplies, such as power generation facilities (e.g., power plants), utility lines, and/or power grids, bulk energy storage devices (e.g., batteries), local power supplies (e.g., wind power, portable or fixed power generators, solar power, combinations thereof, or the like), combinations thereof, or the like. One or more power sources 26 may be available (e.g., solar power with backup utility power). The power sources 26 may be external to the units 10. In at least the case of solar power and/or bulk energy storage devices, some or all of the power sources 26, or components thereof, may be, in whole or in part, internal to the unit 10.

Alternatively, or additionally, a power overload prevention subsystem 18 may be electrically interposed between some or all electricity consuming components of the unit 10 (e.g., electronic displays 12, thermal management systems 20, additional electricity consuming components 22, sensors 24, combinations thereof, or the like) and the power source 26. The power overload prevention subsystem 18 may comprise one or more circuit breakers, fuses, combinations thereof, or the like.

The control subsystem 14 may comprise, or be in electronic communication with (such as, by way of non-limiting example, provided at the power subsystem 16 or otherwise) one or more of: an AC power governor 28, DC power governor 30, and thermal governor 32 (collectively the "governors" for brevity). One or more of the governors may be independent components, part of the control subsystem 14, part of the power subsystem 16, combinations thereof, or the like. One or more of the governors may comprise hardware components, such as but not limited to, processors, electronic storage devices, computing devices, switches, power transformers, power limiters, power regulators, combinations thereof, or the like, and/or software components, such as but not limited to, software code, variables, algorithms, operational command subroutines, combinations thereof, or the like.

The control subsystem 14, power subsystem 16, and one or more of the governors may comprise one or more power meters and/or simulated power meters, such as shown and/or described in one or more of, and/or use one or more of the techniques shown and/or described in: U.S. Pat. No. 11,022,635 granted Jun. 1, 2021 entitled MEASURING POWER CONSUMPTION OF AN ELECTRONIC DISPLAY ASSEMBLY. Such power meters and/or simulated power meters and/or related techniques may serve as sensor(s) 24, though such is not required.

The control subsystem 14 may comprise, or be in electronic communication with, one or more network communication devices, such as for wired and/or wireless transmission and/or receipt of data. Such data may include data regarding unit 10 operation, commands, protocols, software, and/or thresholds, combinations thereof, or the like. The network communication devices may be configured to facilitate electronic communication by way of one or more internets, intranets, cellular networks, combinations thereof, or the like.

The units 10 may comprise one or more internal support frameworks, external housings, cover panels, ventilation systems, filters, openings, combinations thereof, or the like, and may be provided in a variety of sizes, shapes, and/or configurations. Some or all of the components of the units 10 shown and/or described may be internal to the units 10 and/or external thereto.

Figure 2:
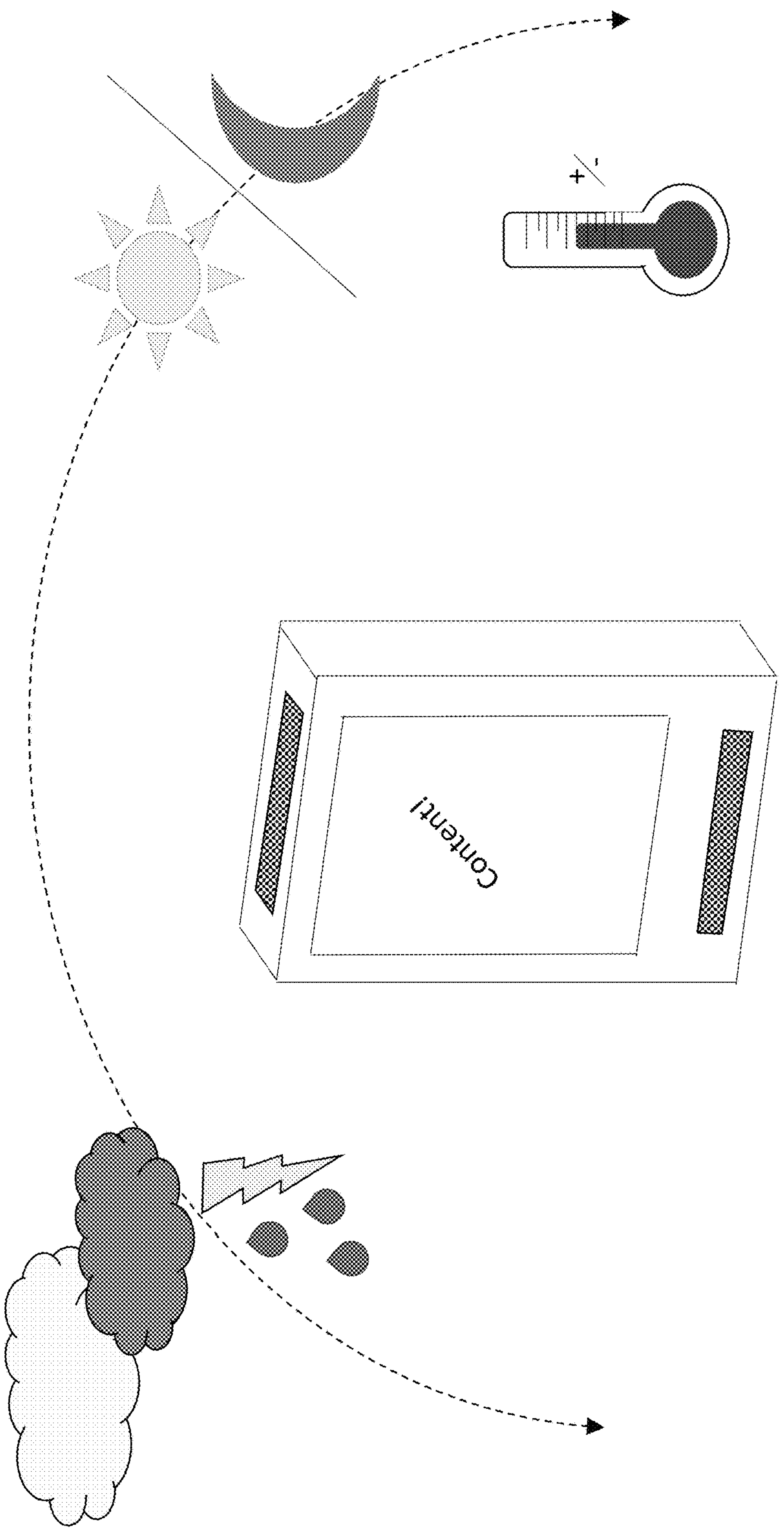
FIG. 2 is a simplified perspective view of the unit of FIG. 1 in an exemplary environmental operation context.

As illustrated with particular regard to FIG. 2, a large variety of ambient weather and other operating conditions experienced by the units 10 may result in drastic fluctuations to unit 10 needs and/or operational characteristics, such as thermal management subsystem 20 demands, experienced temperatures (e.g., due to ambient temperatures, solar loading, solar angle, seasonal changes, weather patterns, combinations thereof, or the like), ambient lighting conditions (e.g., sun and moonlight movement, shade, cloud cover, precipitation, seasonal changes, combinations thereof, and the like) and resulting need to alter electronic display 12 illumination levels to render image sufficiently visible, combinations thereof, or the like. By way of non-limiting example, relatively warm temperatures and/or high solar loading may increase demand on the thermal management subsystem 20 for cooling and/or desire for increased illumination levels of the electronic displays 12 for image visibility, resulting in relatively high electrical demand on the unit 10 and/or high internal temperature levels, thereby pushing the unit 10 to the extremes of its operating abilities. Changing global weather patterns and extreme weather events may contribute to such extreme conditions. The automated power governing features shown and/or described herein may assist with managing the unit 10 such that the most extreme of such conditions, reducing the need to otherwise significantly engineer the units 10 for such unlikely or rare events. This may reduce design complexity and unit 10 cost while improving reliability and user experience. The illustrated and/or described examples of operating conditions are merely exemplary and not intended to be limiting.

Figure 3:
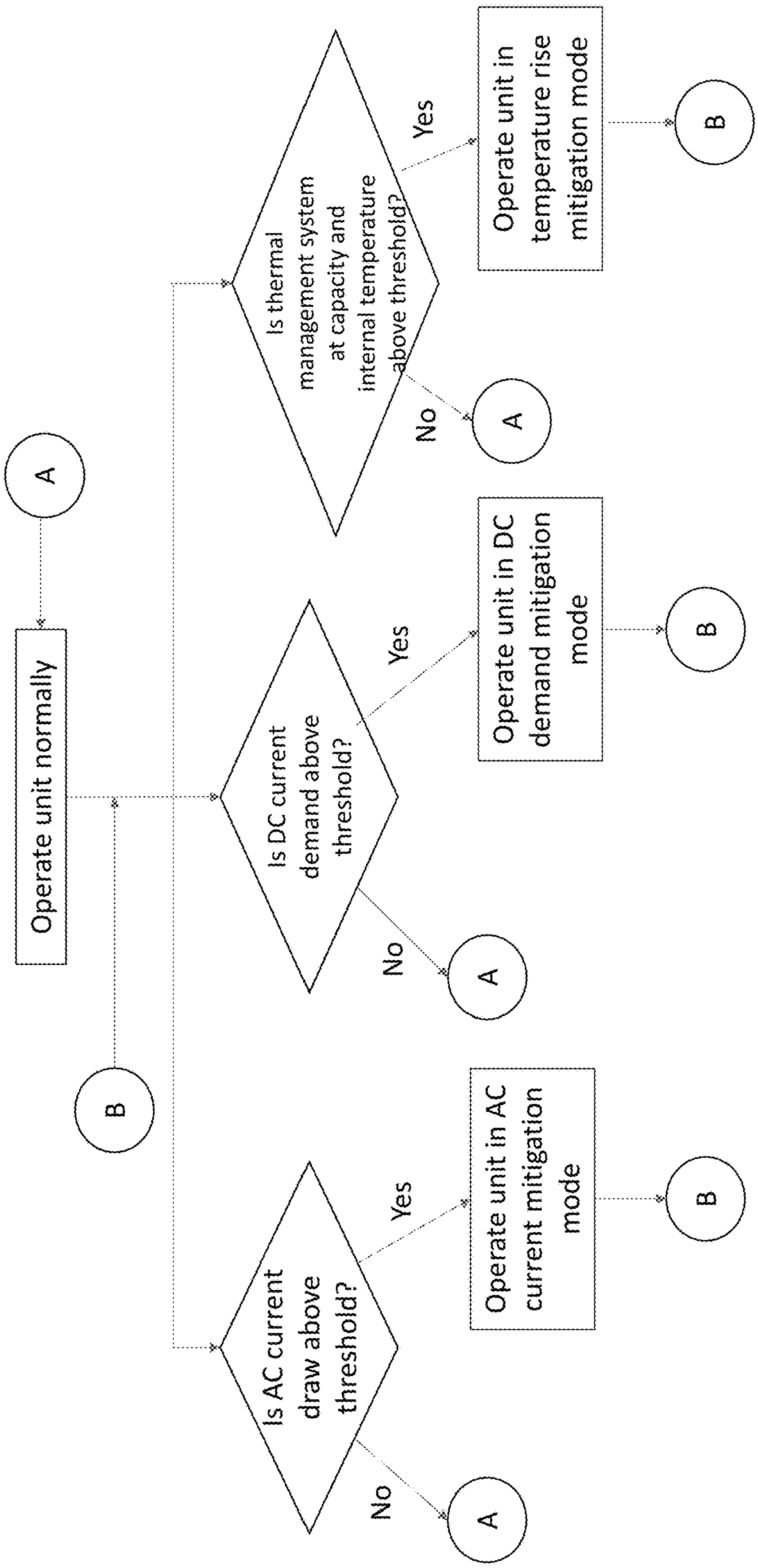
FIG. 3 is a flow chart with exemplary logic for operating the unit of FIG. 1, such as when operating in the various environmental operation conditions illustrated by FIG. 2.

FIG. 3 provides exemplary logic for operating the unit 10, such as during the various exemplary operating conditions of FIG. 2. The control subsystem 14 may operate the unit 10 normally. Such normal operations may include, for example, without limitation, displaying content at the electronic displays 12, adjusting illumination of the electronic displays 12, such as in response to ambient light readings taken by one or more of the sensors 24, operating the thermal management subsystem 20, such as by running fans at various speeds based on temperature readings taken by one or more of the sensors 24, operating customer or peripheral equipment, such as providing wayfinding information, telephonic, voice, and/or video calls, operating wireless "hotspots", receiving and/or processing information from the additional electronic equipment 22, such as cameras, combinations thereof, or the like. These are merely exemplary and not intended to be limiting.

While undertaking normal operations, the control subsystem 14 may monitor one or more operating conditions of the unit 10, such as by way of the sensors 24, thermal management subsystem 20, and/or power subsystem 16. In exemplary embodiments, without limitation, the AC governors 28 may periodically, continuously, randomly, combinations thereof, or the like, monitor AC current draw; the DC governor 30 may periodically, continuously, randomly, combinations thereof, or the like, monitor DC current draw; the thermal governor 32 may periodically, continuously, randomly, combinations thereof, or the like, monitor temperatures (e.g., by way of one or more sensors 24) and thermal management subsystem 20 operations, respectively. Each unit 10 may comprise one, some, or all of the governors 28, 30, 32 in a same or different combination.

Where the AC governor 28 determines that AC current draw is above a predetermined threshold, the AC governor 28 may initiate a current draw mitigation mode. The predetermined threshold may be between 70-99% of the service rated expected installed AC power, though any threshold may be utilized. The current draw mitigation mode may comprise initiating a subroutine which comprises issuing commands, such as by way of the control subsystem 14, to the electronic displays 12 to rapidly, such as in a matter of seconds or less than 1 second, begin reducing illumination levels of the electronic displays 12, such as by dimming the backlight. This may reduce or prevent nuisance tripping of circuit breakers, such as at the power overload prevention subsystem 18. In this way, the current draw mitigation mode may replace and/or override the normal operations. The unit 10 may remain in the current draw mitigation mode until AC current draw is below the predetermined threshold, such as by at least a margin to prevent continued movement between normal operation mode and current draw mitigation mode. Where the AC governor 28 determines that AC current draw is below the predetermined threshold, the AC governor 28 continue with normal operations.

The AC governor 28, control subsystem 14, and/or power subsystem 16 may monitor current supplied, such as on a continual, periodic, and/or random basis. Where the current draw is below an expected level, an electronic notification may be automatically generated and transmitted, such as by way of one or more network communication devices, to one or more remote electronic devices (e.g., computers, smart phones, tablets, servers, etc.). The network communication devices and transmission may be made by way of one or more internets, intranets, cellular networks, combinations thereof, or the like.

Expected power supply levels, including current supply levels, may vary based on unit 10 configuration, such as size, number, and/or type of the electronic displays 12 installed, anticipated driving levels for the electronic displays 12, other equipment 22 installed, expected ambient conditions, combinations thereof, and the like. Such power consumption levels may vary from approximately 200 watts to 5000+ watts, though any power level may be expected. Such expected current may vary from less than 2 amps to over 25 amps, though any current level may be expected. Circuit breakers may be configured to trip at less than 5 amps to over 30 amps, though any threshold may be utilized. These are provided by way of non-limiting example.

Actual power supplied may vary based on power source 26 type and/or operational fluctuations, economic issues (e.g., operator unable or unwilling to pay for certain power supply at peak times, by way of non-limiting example), combinations thereof, or the like.

Where the DC governor 30 determines that DC current demand is above a predetermined threshold, the DC governor 30 may initiate a power demand mitigation mode. The predetermined threshold may be reflective of limits of one or more installed power supplies, such as forming part of the power subsystem 16. The predetermined threshold may be between 80-100% of the limits of the one or more installed power supplies, though any amount may be utilized. The power demand mitigation mode may comprise initiating a subroutine which comprises issuing commands, such as by way of the control subsystem 14, to the electronic displays 12 to at a relatively moderate pace, such as in a matter of seconds (e.g., between 3-60 seconds) or minutes, begin reducing illumination levels of the electronic displays 12, such as by dimming the backlight. This may reduce or prevent the one or more power supplies from reaching their maximum limit and turning off. In this way, the power demand mitigation mode may replace and/or override the normal operations. The unit 10 may remain in the power demand mitigation mode until DC current demand is below the predetermined threshold, such as by at least a margin to prevent continued movement between normal operation mode and power demand mitigation mode. Where the DC governor 30 determines that DC current demand is below the predetermined threshold, the DC governor 30 may continue with normal operations.

If the one or more power supplies reach their current limit, they may be configured to automatically shut off and be restarted.

Where the thermal governor 32 determines that the thermal management subsystem 20 is operating at a predetermined capacity threshold and internal temperatures, such as determined by the one or more sensors 24, are above a predetermined temperature threshold, the thermal governor 32 may initiate a temperature rise mitigation mode. Stated another way, the thermal management subsystem 20 may be performing at a maximum level for heat removal or some threshold thereof. For example, without limitation, the predetermined capacity threshold may be between 80-100% of the capacity of the thermal management subsystem 20 (e.g., fans operating at 80-100% of maximum speed), though any amount may be utilized. The predetermined temperature threshold may be the same or different for each sensor 24, such as based on location and/or tolerance of local components. In exemplary embodiments, without limitation, the internal temperature condition for entering the temperature rise mitigation mode may be met where any one of the internal temperatures are above the predetermined temperature threshold and/or the respective predetermined temperature threshold for the sensor 24. In other exemplary embodiments, without limitation, a plurality, or all, of the internal temperatures are above the predetermined temperature threshold and/or the respective predetermined temperature threshold for the sensor 24 before the temperature conditions for entering the temperature rise mitigation mode are met.

The temperature rise mitigation mode may comprise initiating a subroutine which comprises issuing commands, such as by way of the control subsystem 14, to the electronic displays 12 at a relatively slow pace, such as in a matter of minutes (e.g., between 5-60 minutes), begin reducing illumination levels of the electronic displays 12, such as by dimming the backlight, such as down to a zero level. This may reduce or prevent damage to temperature sensitive components of the unit 10. In this way, the temperature rise mitigation mode may replace and/or override the normal operations. The unit 10 may remain in the temperature rise mitigation mode until the internal temperatures and/or thermal management subsystem 20 capacity is below the respective predetermined thresholds, such as by at least a margin to prevent continued movement between normal operation mode and temperature rise mitigation mode. Where the thermal governor 32 determines that internal temperatures and/or thermal management subsystem 20 capacity are below the predetermined threshold, the thermal governor 32 may continue with normal operations.

These governors 28, 30, and 32 may be particularly important for preventing shut down of the units 10 and/or related components, such as the thermal management subsystems 20 which, if shut down, particularly in a moment of existing extreme operating conditions, may trigger a rapid rise in internal temperatures and comprise of the units 10. Thus, the governors 28, 30, and 32 and related operations may serve to maintain operations of the unit 10, such as the thermal management subsystem 20, and/or minimize disruption to user experiences.

The various predetermined thresholds and/or criteria for the governors 28, 30, and/or 32 may be set and/or varied by programming, such as by way of receipt of authenticated change commands from one or more remote electronic devices.

The governors 28, 30, and/or 32 may operate independently from one another, in exemplary embodiments without limitation. The analysis undertaken by each of the governors 28, 30, and/or 32 may be performed in parallel and/or in any sequence.

The integrated power governing features may alternatively, or additionally, permit the reduction in power supplies, such as of the power subsystem 16, for a unit 10 and/or reduce power consumption for a unit 10, among other benefits. This may allow provided power supplies, such as of the power subsystem 16, to operate closer to maximum capacity, whereby increased efficiencies are generally found, thereby increasing operational efficiency of the unit 10 and reducing costs of manufacture, among other benefits.

Figure 4:
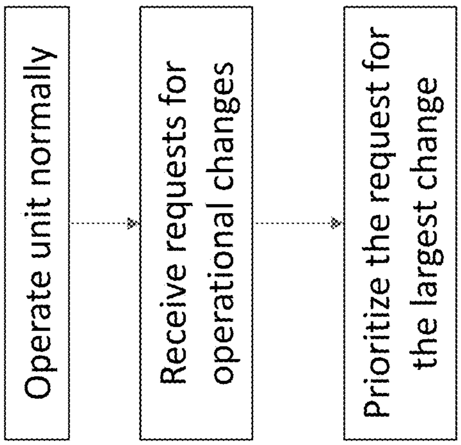
FIG. 4 is a flow chart with other exemplary logic for operating the unit of FIG. 1, such as when operating in the various environmental operation conditions illustrated by FIG. 2 and/or in conjunction with the logic of FIG. 3.

As illustrated with particular regard to FIG. 4, requests for operational changes may be prioritized and/or centralized for disposition. For example, without limitation, operational change requests made by the governors 28, 30, and/or 32 may be centrally dispositioned, such as at the control subsystem 14. Alternatively, or additionally, the governors 28, 30, and/or 32 may be in intercommunication and/or communication with a particular one of the governors 28, 30, and/or 32 which may be designated for arbitrating and/or prioritizing incoming requests. Where multiple requests for operational changes are received, such as from the different governors 28, 30, and/or 32 at the control subsystem 14, the control subsystem 14 or other dispositioning unit (e.g., designated one of the governors 28, 30, and/or 32) may be configured to prioritize the requests based on an amount of operational adjustment requested. For example, the largest operational change may be prioritized over the other requests. In exemplary embodiments, this may require acting on the request which results in the largest power and/or electronic display 12 illumination level reduction.

The remaining requests may be discarded, ignored, and/or placed on hold. The remaining requests may be acted on subsequently, such as when the particular request being acted on is no longer valid, and/or the requests may be discarded as the various requests become no longer valid. For example, without limitation, the highest prioritized request may comprise the largest illumination level reduction which may be sufficient to request the lower-level requests. As another example, without limitation, once the highest prioritized request is performed for a period of time, the request may drop off due to sufficient changes to operational conditions that render the request no longer needed, and the control subsystem 14, for example, may move to a secondary request, tertiary request, etc. which remain valid based on updated operating conditions.

While three specific governors 28, 30, and/or 32 may be utilized in exemplary embodiments, one or more additional governors 31 may optionally be utilized in place of, or in addition to, the governors 28, 30, and/or 32. For example, without limitation, one of the additional governors 31 may be configured to trigger electronic display 12 dimming and/or other power consumption reduction efforts where one or more operational failures in the thermal management system 20 are detected. For example, without limitation, where one or more fan failures are detected. Such operational failures may be detected through lack of signal response, lack of power supply, combinations thereof, or the like. In other exemplary embodiments, without limitation, one of the additional governors 31 may be configured to trigger electronic display 12 dimming and/or other power consumption reduction efforts where external power supply changes or ceases, such as from one or more solar panels, utility power supplies, wind turbines, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like, configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold solely non-transitory signals.

What is claimed is:

1. A display unit for executing operational updates in a prioritized fashion, said display unit comprising:

an electronic display;

a thermal management subsystem;

one or more sensors; and a control subsystem in electronic communication with the electronic display, the one or more sensors, and the thermal management subsystem, where the control subsystem comprises one or more electronic storage devices with software instructions, which when executed, configure one or more processors to:

receive requests to update established operational parameters for the electronic display and the thermal management subsystem, where the established operational parameters comprise operational parameters for the electronic display and the thermal management subsystem specific to sensor readings from the one or more sensors;

determine which of the requests would, if implemented, provide a largest change to a respective one or ones of the established operational parameters affected by a respective one of the requests ("largest request"); and prioritize the largest request for execution.

2. The display unit of claim 1 wherein:

the operational parameters comprise illumination levels for the electronic display and temperature levels for the thermal management subsystem.

3. The display unit of claim 2 wherein:

the one or more sensors comprise at least one temperature sensor and at least one ambient light sensor;

the illumination levels are specific to ambient light level readings from one or more of the at least one ambient light sensor; and the temperature levels are specific to temperature level readings from one or more of the at least one temperature sensor.

4. The display unit of claim 3 wherein:

the illumination levels are specific to temperature level readings from one or more of the at least one temperature sensor.

5. The display unit of claim 3 wherein:

the thermal management subsystem comprises one or more fans; and the operational parameters comprise fan speeds levels.

6. The display unit of claim 2 wherein:

the one or more sensors comprise multiple temperature sensors spaced apart within the display unit; and the temperature levels are different for at least some of the multiple temperature sensors.

7. The display unit of claim 3 wherein:

at least some of the requests are directed to a subset of the operational parameters and/or the sensor readings.

8. The display unit of claim 1 wherein:

the control system is configured to identify the largest request as a respective one of the requests, which if implemented, would result in a largest absolute change in value to a respective one of the operational parameters.

9. The display unit of claim 1 wherein:

the control system is configured to identify the largest request as a respective one of the requests, which if implemented, would result in a largest absolute change in value to a respective one of the sensor readings.

10. The display unit of claim 1 wherein:

the control subsystem is configured to determine an expected energy consumption differential for each of the requests; and the control system is configured to identify the largest request as a respective one of the requests, which if implemented, would result in a largest expected energy consumption differential as the largest request.

11. The display unit of claim 1 wherein:

the controller is configured to arrange the requests into a hierarchy based on size; and the controller is configured to disposition the results based on their position within the hierarchy.

12. The display unit of claim 1 wherein:

the control subsystem comprises at least one of: an alternating current (AC) governor, a direct current (DC) governor, and a thermal governor; and the control system is configured to assign each of the requests to a respective one of the governors for execution.

13. The display unit of claim 1 wherein:

the controller is configured to discard or ignore all of the requests aside from the largest request.

14. The display unit of claim 1 wherein:

the established operational parameters include operational parameters where failure of one or more specific components is detected.

15. The display unit of claim 14 wherein:

the established operational parameters include a reduced illumination level of the electronic display where failure of the thermal management subsystem is detected.

16. The display unit of claim 14 wherein:

the controller is configured to determine a failure event where a lack of operational signal is received from the thermal management subsystem for at least a predetermined period of time.

17. The display unit of claim 1 wherein:

the one or more electronic displays each comprise a directly backlit liquid crystal display (LCD).

18. The display unit of claim 1 wherein:

the controller is configured to monitor readings from the temperature sensors and the one or more ambient light sensors and adjust operations of the thermal management system and the electronic displays in accordance with the readings.

19. A display unit for executing operational updates in a prioritized fashion, said display unit comprising:

an electronic display;

a thermal management subsystem comprising airflow pathways and fans located along said airflow pathways such that a given one of the fans is located along each of the airflow pathways, respectively;

temperature sensors located along said airflow pathways such that a given one of the temperature sensors is located along each of the airflow pathways, respectively;

one or more ambient light sensors, at least one of which is directed towards an ambient environment to monitor ambient sunlight levels; and a control subsystem in electronic communication with the electronic display, the thermal management subsystem, the temperature sensors, and the one or more ambient light sensors, where the control subsystem comprises one or more electronic storage devices with software instructions, which when executed, configure one or more processors to:

establish operating parameters for the thermal management system comprising temperature specific fan speed levels for the fans, and ambient light level specific illumination levels for the electronic display;

monitor readings from the temperature sensors and the one or more ambient light sensors and adjust operations of the thermal management system and the electronic display in accordance with the readings;

receive requests to update the established operational parameters for the electronic display and the thermal management subsystem;

identify which of the requests would result in a largest change to a respective one or ones of the established operational parameters affected by a respective one of the requests as largest request; and prioritize the largest request for execution.

20. A display unit for executing operational updates in a prioritized fashion, said display unit comprising:

electronic displays;

a thermal management subsystem comprising airflow pathways and fans located along said airflow pathways such that a given one of the fans is located along each of the airflow pathways, respectively;

temperature sensors located along said airflow pathways such that a given one of the temperature sensors is located along each of the airflow pathways, respectively;

ambient light sensors, each of which is associated with a given one of the electronic displays, respectively; and a control subsystem in electronic communication with the electronic display, the thermal management subsystem, the temperature sensors, and the one or more ambient light sensors, where the control subsystem comprises one or more electronic storage devices with software instructions, which when executed, configure one or more processors to:

establish operating parameters for the thermal management system comprising temperature specific fan speeds for the fans, and ambient light level specific and temperature specific illumination levels for the electronic displays;

monitor temperature readings from the temperature sensors and ambient light level readings from the ambient light sensors and adjust operations of the thermal management system and the electronic displays in accordance with the readings;

receive requests to update the established operational parameters for the electronic display and the thermal management subsystem;

on a request-by-request basis, determine an absolute change in value for the established operating parameters affected by a respective one of the requests, if implemented;

arrange the requests into a hierarchy based on the absolute change in value; and execute the requests in accordance with the hierarchy.

* * * * *